(12) United States Patent
Mochizuki et al.

(10) Patent No.: US 6,330,576 B1
(45) Date of Patent: Dec. 11, 2001

(54) USER-FRIENDLY INFORMATION PROCESSING DEVICE AND METHOD AND COMPUTER PROGRAM PRODUCT FOR RETRIEVING AND DISPLAYING OBJECTS

(75) Inventors: Takatoshi Mochizuki, Amagasaki; Kimihiko Higashio, Kobe, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/259,132

(22) Filed: Feb. 26, 1999

(30) Foreign Application Priority Data

Feb. 27, 1998 (JP) ................................................. 10-047730
Mar. 23, 1998 (JP) ................................................. 10-074198
Dec. 8, 1998 (JP) ................................................. 10-348431

(51) Int. Cl.$^7$ .................................................. G06F 17/30
(52) U.S. Cl. .............................................. 707/529; 707/3
(58) Field of Search .............................. 707/2, 3, 4, 526, 707/529; 345/968

(56) References Cited

U.S. PATENT DOCUMENTS

| | | | |
|---|---|---|---|
| 5,625,810 | * | 4/1997 | Kurosu et al. ........................ 395/601 |
| 5,642,502 | * | 6/1997 | Driscoll ................................. 395/605 |
| 5,761,496 | * | 6/1998 | Hattori ................................... 395/605 |
| 5,911,139 | * | 6/1999 | Jain et al. ................................. 707/3 |
| 5,920,854 | * | 7/1999 | Kirsh et al. .............................. 707/3 |
| 5,950,187 | * | 9/1999 | Tsuda ...................................... 707/3 |
| 6,012,053 | * | 1/2000 | Pant et al. ................................ 707/3 |
| 6,044,365 | * | 3/2000 | Cannon et al. .......................... 707/2 |

FOREIGN PATENT DOCUMENTS

| | | | |
|---|---|---|---|
| 6-259485 | 9/1994 | (JP) | ......................... 15/40 |
| 7-114573 | 5/1995 | (JP) | ......................... 17/30 |

* cited by examiner

Primary Examiner—John Breene
Assistant Examiner—Susan Rayyan
(74) Attorney, Agent, or Firm—Sidley Austin Brown & Wood

(57) ABSTRACT

An information processing device and method and computer program product which allow users to easily determine whether retrieved objects are desired ones or not, by displaying the retrieved objects in a different manner, such as at different display densities, with frames of different thicknesses, according to degree of similarity between a retrieval constraint and the objects themselves or attribute information annexed thereto or words/phrases included therein.

27 Claims, 13 Drawing Sheets

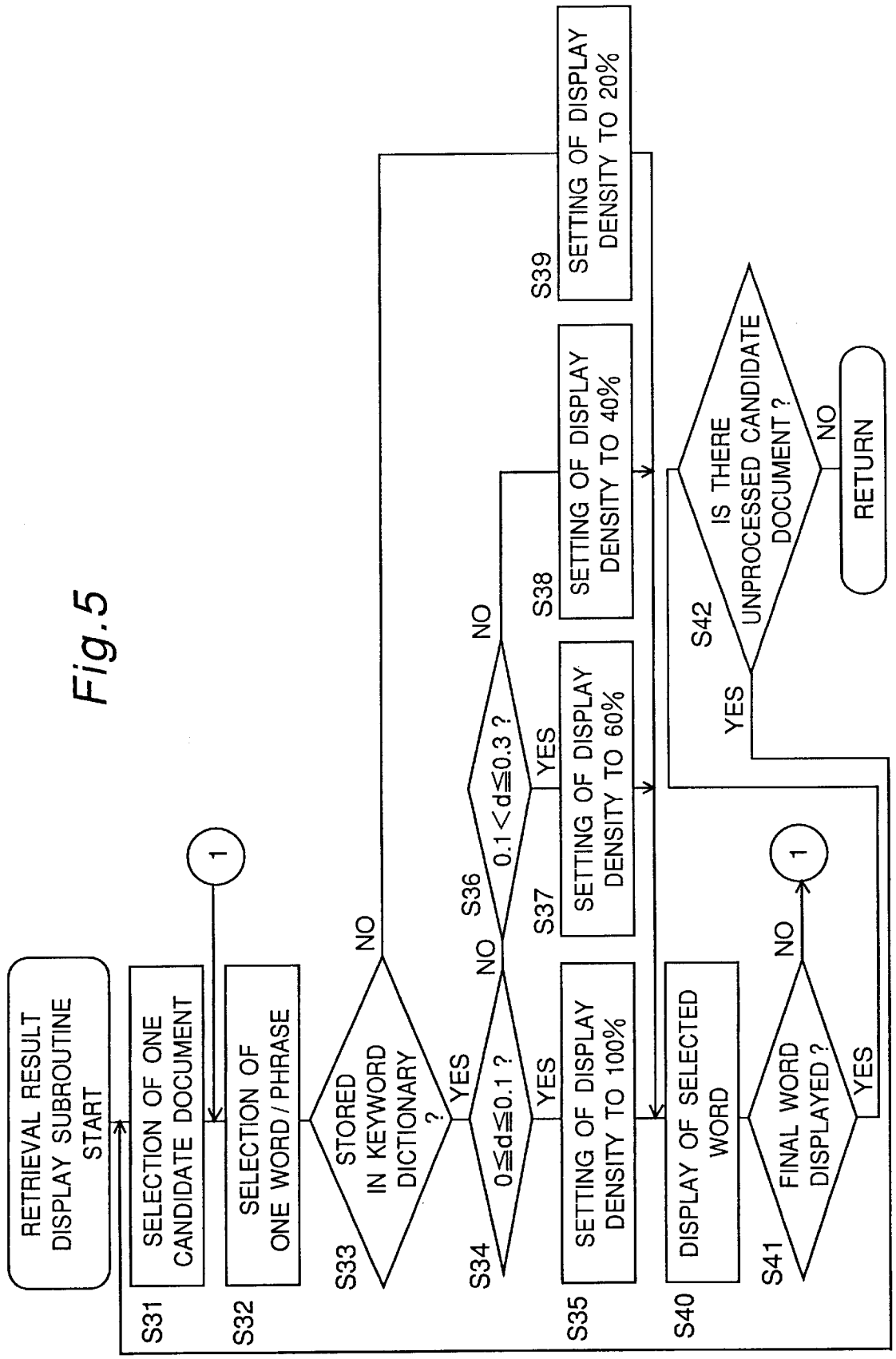

KEYWORD DICTIONARY

| BASIC KEYWORD | SIMILAR KEYWORD | d |
|---|---|---|
| Internet | Network | 0.3 |
| Internet | WorldWideWeb | 0.1 |
| Internet | FTP | 0.1 |
| Internet | E-mail | 0.1 |
| Internet | On-line | 0.6 |
| Internet | Server | 0.3 |

SETTING OF DISPLAY DENSITY

0 ≦ d ≦ 0.1    100%
0.1 < d ≦ 0.3   60%
0.3 < d ≦ 1.0   40%

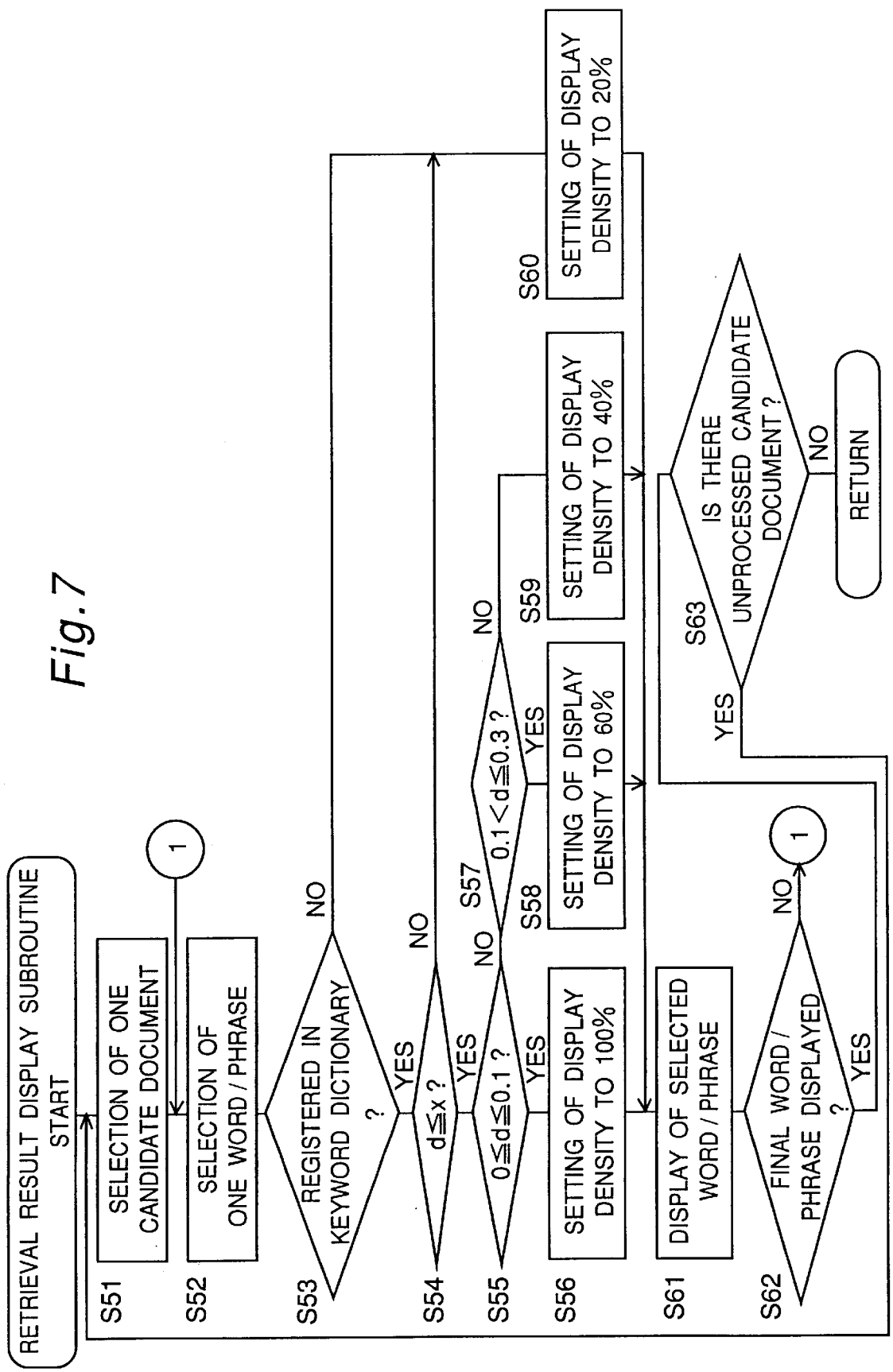

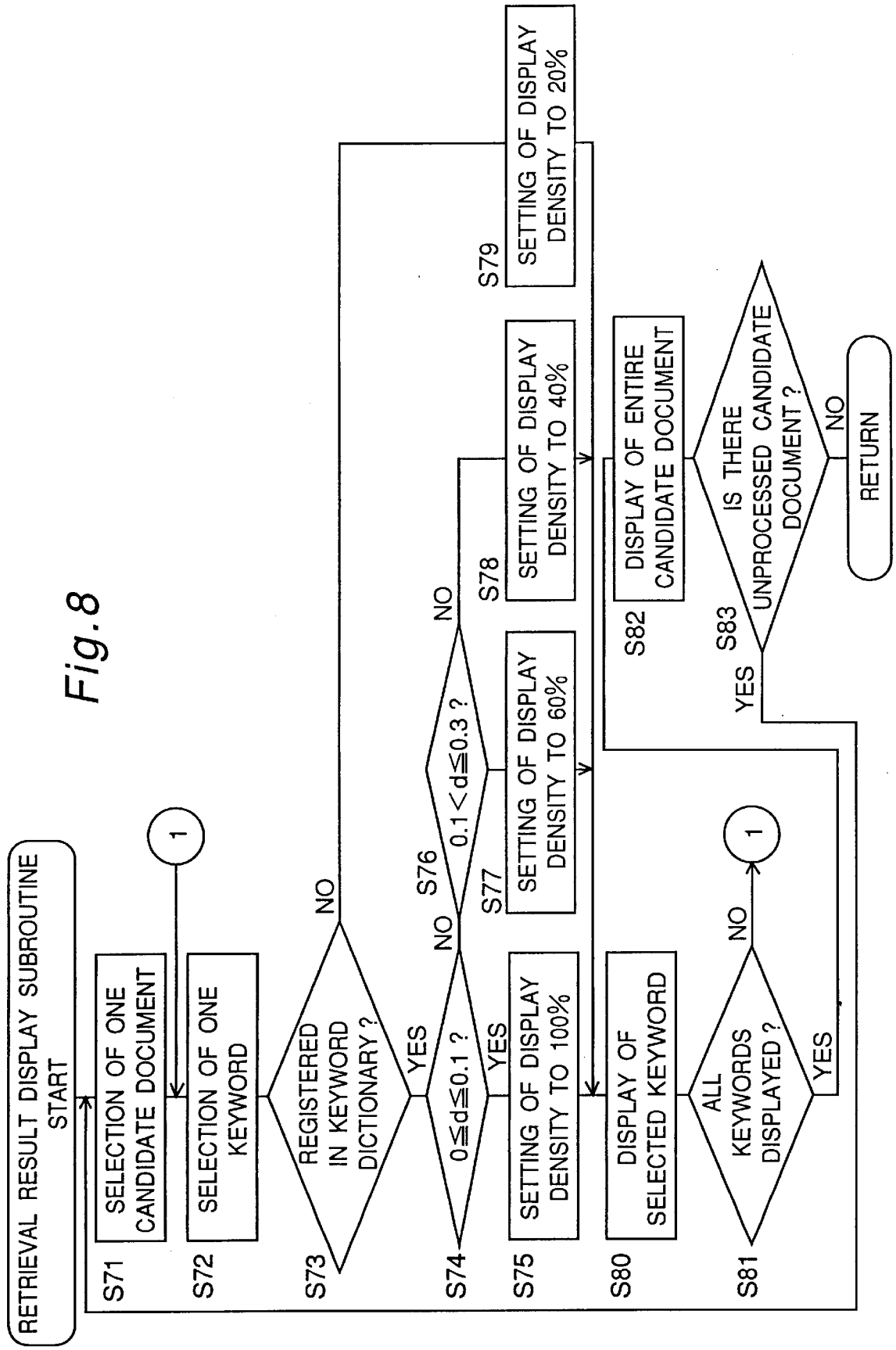

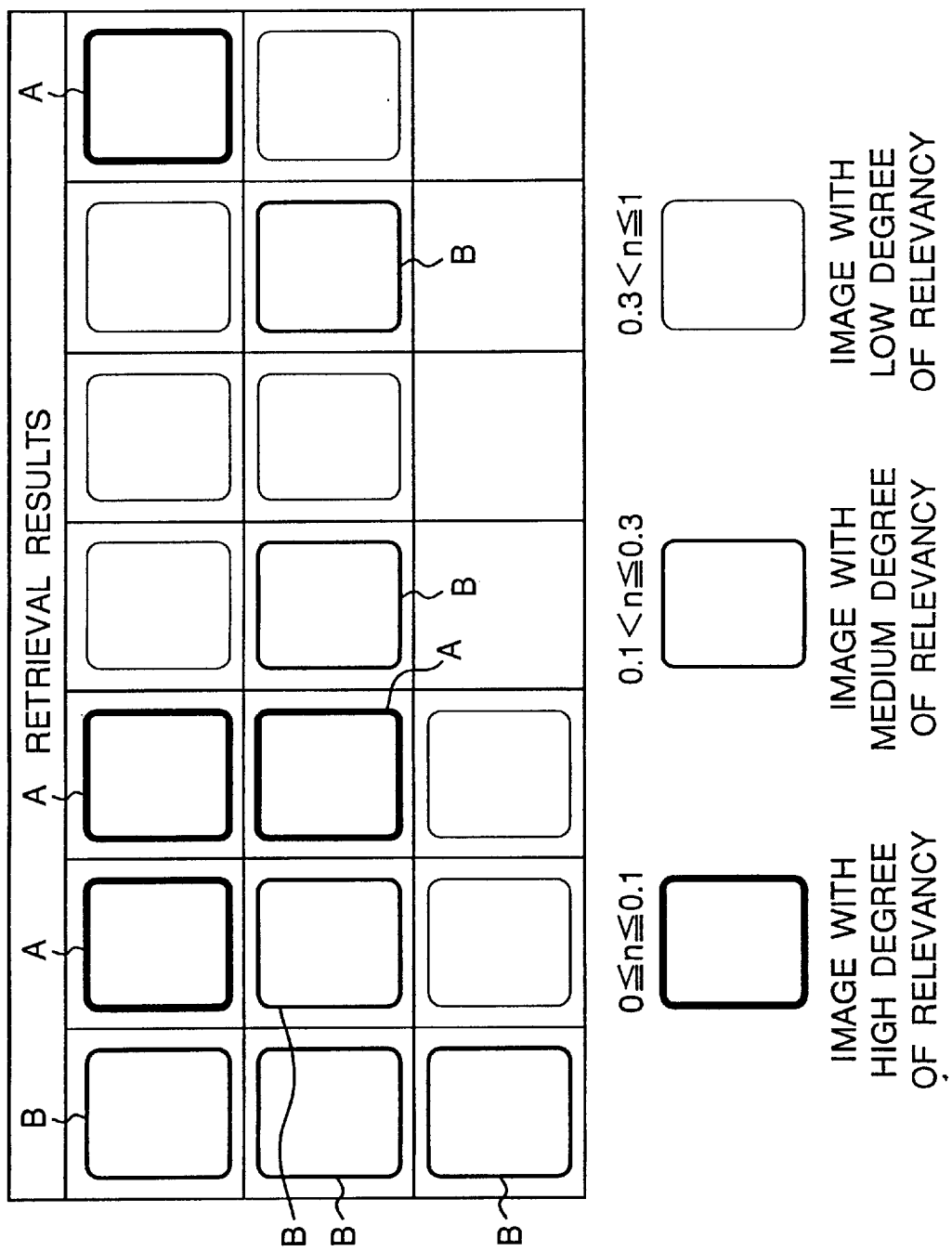

USER-FRIENDLY INFORMATION PROCESSING DEVICE AND METHOD AND COMPUTER PROGRAM PRODUCT FOR RETRIEVING AND DISPLAYING OBJECTS

This application is based on applications Nos. 10-47730, 10-74198 and 10-348431 filed in Japan, the contents of which are hereby incorporated by reference.

BACKGROUND OF THE INVENTION

The present invention relates to an information processing device, an information processing method, and a computer program product for retrieving desired objects such as text data, image data, etc. from a database containing a plurality of such objects to display the desired objects.

With the rapid spread of computers in recent years, the amount of electronic information to be handled by people has been increased rapidly. In order to manage the electronic information efficiently, a database containing a large number of pieces of information is prepared to retrieve desired electronic information therefrom as necessary.

Regarding the retrieval of text data (i.e., data including character string), there is a technique of setting an appropriate keyword as a search key to retrieve text data including a word/phrase corresponding to the keyword from the database. Further, Japanese Patent Laid-Open Publication No. 6-259485 discloses a technique to be used in displaying the retrieved text data on a display device. In this technique, a word/phrase corresponding to a keyword used for retrieval is emphatically displayed in a manner distinguished from other words.

When retrieval of the text data is executed by using a keyword as described above, normally, a plurality of text data (a large number of text data, depending on a case) are retrieved as candidate documents. Thus, there are cases in which a user desires to check the candidate documents as to whether or not they are desired ones.

Hitherto, to determine whether a candidate document is a desired document, a user had to check contents is of the entire candidate document. This is a very burdensome task to the user. In such a situation, there is a growing demand for the development of a technique of allowing a user to easily check whether retrieved candidate documents are desired ones.

In the technique described in the Japanese Patent Laid-Open Publication No. 6-259485, only a word/phrase corresponding to the keyword is emphatically displayed. Thus, the same words or phrases are emphatically displayed in the respective candidate documents. Thus, the technique is not convenient enough to be used to check the contents of the candidate documents.

On the other hand, Japanese Patent Laid-open Publication No. 7-114573 discloses an image retrieval device wherein images, which are objects, are stored along with associated search keys (keywords) serving as attribute information, and an image having a search key or keys coincident with a search key or keys entered as a retrieval constraint is retrieved and displayed.

In the image retrieval device, a plurality of retrieved images are displayed in descending order of degrees of similarity to the retrieval constraint. The degree of similarity is obtained by calculating a function of a precedence correlation between the ranking of the search keys serving as the retrieval constraint ranked by an input order thereof and a ranking indicating an occurrence order of the corresponding search keys annexed to each image.

In the image retrieval device, retrieved images are displayed in the descending order of degrees of similarity to the input retrieval constraint of the attribute information of the retrieved image. Thus, an image desired by a user can be displayed at a higher rank.

However, because in the image retrieval device, the degrees of similarity of displayed images are not shown, only one retrieval operation does not enable the user to determine which are target or desired images when there are many candidate images. Thus, a threshold degree of similarity for determining candidate images is increased and a subsequent retrieval is performed using the increased threshold degree of similarity.

However, as described above, because the degrees of similarity of displayed images are not shown, the user does not know what is a proper threshold for efficiently limiting the candidate images. Thus, the user cannot help setting a threshold as he or she likes. If a large number of candidate images each having a high degree of similarity are registered, however, the user may repeat retrieval operations, although it is unnecessary. Thus, the image retrieval device is not user-friendly, and has a problem that the user cannot retrieve images efficiently.

SUMMARY OF THE INVENTION is It is an object of the present invention to provide an information processing method capable of solving the above-mentioned problems, and also to provide a user-friendly information processing device and a computer program product to carry out such an information processing method.

It is another object of the present invention to provide an information processing method which allow users to easily check contents of retrieved documents, and also to provide a user-friendly information processing device and a computer program product to carry out such an information processing method.

It is another object of the present invention to provide an information processing method capable of emphatically displaying retrieved objects in different appearances according to their degrees of similarity or relevancy to allow a user to set an appropriate degree of ambiguity for obtaining desired objects with out trial and error, and also to provide a user-friendly information processing device and a computer program product to carry out such an information processing method.

In an information processing method, according to an aspect of the present invention, for retrieving and displaying desired objects from a database wherein a plurality of objects including text data are registered, a keyword is set as a retrieval constraint, and objects containing a word/phrase is corresponding to the keyword are retrieved from the database. Then, a process is performed to display the retrieved objects such that in each retrieved object, words/phrases corresponding to the keyword set as the retrieval constraint and words/phrases related to this keyword are displayed in a different manner from that for other words included in this object.

That is, the words or phrases corresponding to and related with the set keyword are displayed differently in appearance, or visually differently from the other words. This allows a user to seize contents of the candidate objects only by checking the differently displayed words or phrase and without checking the entire text data.

The term "object" used herein means a piece of electronic information (for example, text data, image data, or the like)

serving as a subject to be stored/managed by an information processing device as well as a folder containing a plurality of pieces of such electronic information.

The above method can be carried out by an information processing device and a computer program product on a recording medium executable by a computer according to the present invention, which each include:

setting means for setting a keyword as a retrieval constraint;

retrieval means for retrieving from the database objects containing a word/phrase corresponding to the keyword set by the setting means; and processing means for performing a process to display the objects retrieved by the retrieval means such that in each retrieved object, words/phrases corresponding to the keyword set by the setting means and words/phrases related to this keyword are displayed in a different manner from that for other words included in this object.

In information processing method, according to another aspect of the present invention, for retrieving and displaying desired objects from a database wherein a plurality of objects are registered with pieces of attribute information, a piece of attribute information is set as a retrieval constraint, and objects are retrieved from the database, based on the set piece of attribute information. Then, a process is performed to display the retrieved objects in different manners according to degrees, of similarity between pieces of attribute information annexed to the respective retrieved objects and the piece of attribute information set as the retrieval constraint.

The term "attribute information" used herein means information indicating attributes of an object as defined above. The "attribute information" includes, for example, a search key (keyword, color, shape, and the like), an author's name, data preparation date, a data registration date, data size, comments, icons, or the like.

This information processing method can be carried out by an information processing device and a computer program product on a recording medium executable by a computer according to the present invention, which each include:

setting means for setting a piece of attribute information as a retrieval constraint;

retrieval means for retrieving objects from the database based on the piece of attribute information set by the setting means; and processing means for performing a process to display the objects retrieved by the retrieval means in different manners according to degrees of similarity between pieces of attribute information annexed to the respective retrieved objects and the piece of attribute information set by the setting means.

Furthermore, in an information processing method, according to still another aspect of the present invention, for retrieving and displaying desired objects from a database wherein a plurality of objects are registered, an object is set as a retrieval constraint, and objects are retrieved from the database, based on the set object. Then, a process is performed to display the retrieved objects in different manners according to degrees of similarity between the retrieved objects and the object set as the retrieval constraint.

This information processing method can be carried is out by an information processing device and a computer program product on a recording medium executable by a computer according to the present invention, which each include:

setting means for setting an object as a retrieval constraint;

retrieval means for retrieving objects from the database based on the object set by the setting means; and processing means for performing a process to display the objects retrieved by the retrieval means in different manners according to degrees of similarity between the retrieved objects and the object set by the setting means.

Other objects and features of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a flowchart of a retrieval result display subroutine;

FIG. 7 is a flowchart of another retrieval result display subroutine;

FIG. 8 is a flowchart of still another retrieval result display subroutine;

FIG. 13 shows another example of display of candidate images.

DETAILED DESCRIPTION OF THE PREFERRED EMBODIMENTS

First Embodiment

Figure 1:
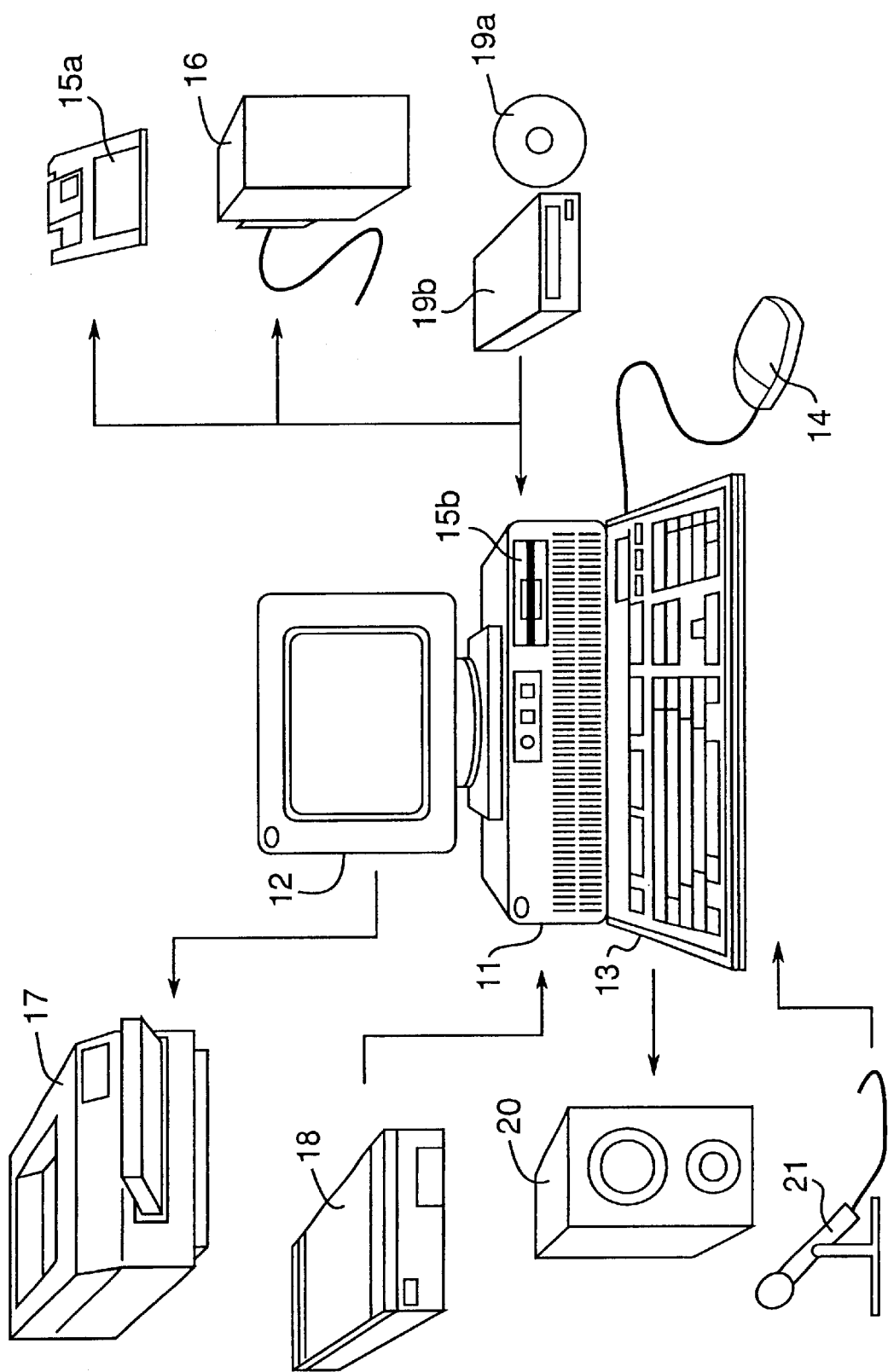
FIG. 1 shows the construction of hardware of an information processing device according to an embodiment of the present invention.
Figure 2:
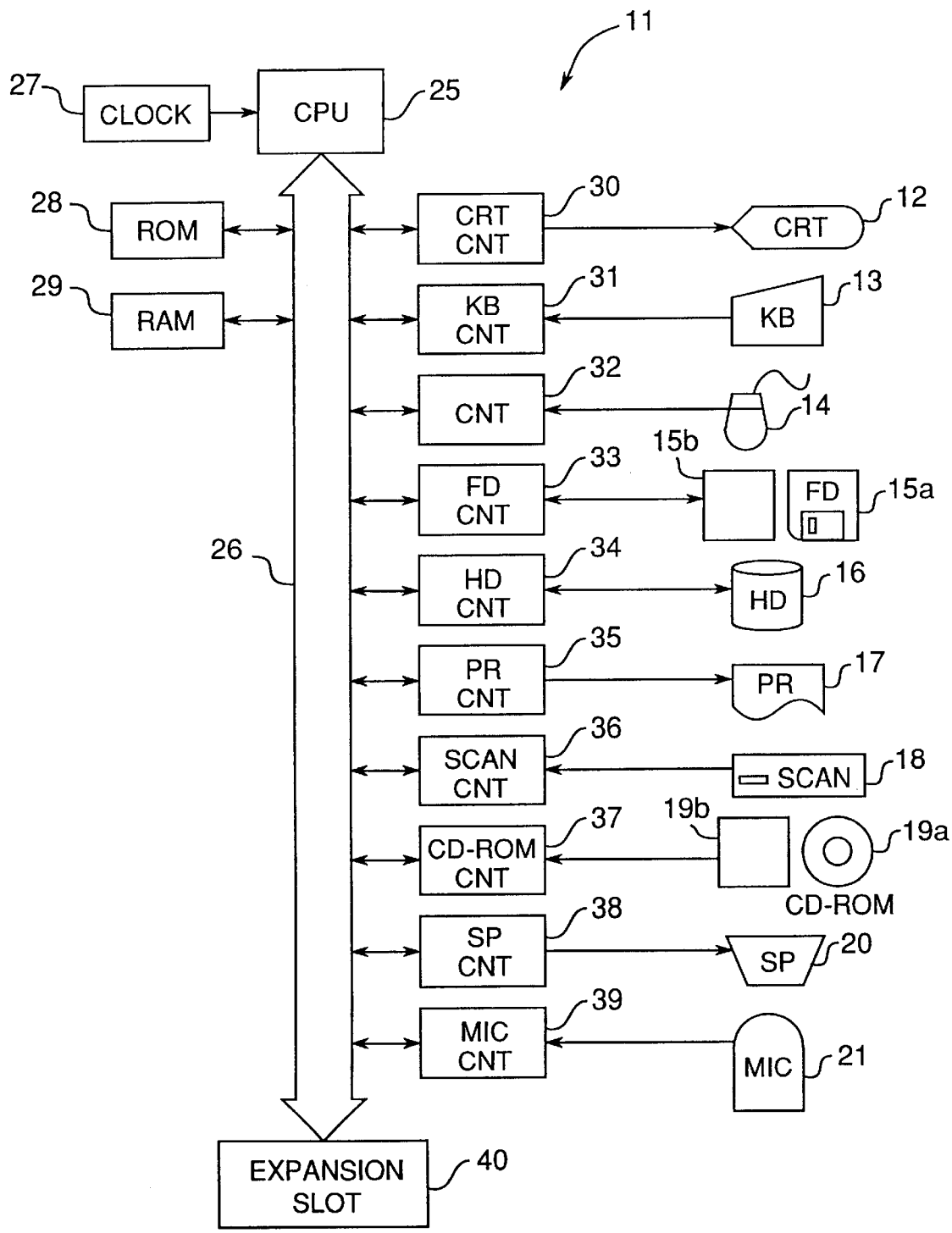
FIG. 2 is a block diagram of the hardware of FIG. 1 depicted centering on a CPU.

FIGS. 1 and 2 show the construction of hardware of an information processing device according to a first embodiment of the present invention.

As shown in FIG. 1, the information processing device includes a control device 11 having a CPU (central processing unit) 25 (see FIG. 2) mounted therein to control the operation of the entire information processing device, a display 12, a keyboard 13, a mouse 14, a floppy disk drive 15b, a hard disk device 16, a printer 17, a scanner 18, a CD-ROM drive 19b, a speaker 20, and a microphone 21.

The display 12 displays characters, images, and various pieces of information necessary for operating the information processing device. The keyboard 13 and the mouse 14 are used for various input operations and instruction operations. A floppy disk 15a is inserted in the floppy disk drive 15b provided in the control device 11 to store and/or reproduce data. The hard disk device 16 stores various pieces of information such as a plurality of objects including text data, and degrees of inter-keyword similarity, i.e., degrees of similarity among keywords. The printer 17 prints out documents based on the text data, documents having graphics and/or pictures drawn thereon by edition, and so on. The scanner 18 reads documents and outputs corresponding data. The CD-ROM 19a contains various data including text data in a predetermined format and it is placed in the CD-ROM drive 19b to reproduce the stored data. The speaker 20 performs voice output. The microphone 21 performs voice input. The data read by the scanner 18 and the CD-ROM drive 19b are stored in the hard disk device 16.

The hard disk device 16, the scanner 18, the CD-ROM drive 19b, the speaker 20, and the microphone 21 may be incorporated in the control device 11 and constructed together as a unit.

FIG. 2 is a block diagram of the information processing device of FIG. 1 centered on the CPU 25 built in the control device 11.

For the CPU 25, a product i80486DX manufactured by Intel, for example, is used. Through a data bus 26, the CPU 25 is connected with a ROM (read-only memory) 28 storing programs for executing various operations which will be described later, aRAM (random access memory) 29 storing various data and programs, a display control circuit 30 for displaying documents and images on the display 12, a keyboard control circuit 31 for controlling transfer of inputs from the keyboard 13, a mouse control circuit 32 for controlling transfer of inputs from the mouse 14, a floppy disk drive control circuit 33 for controlling the floppy disk drive 15b, a hard disk control circuit 34 for controlling the hard disk device 16, a printer control circuit 35 for controlling the output operation of the printer 17, a scanner control circuit 36 for controlling the document input operation of the scanner 18, a CD-ROM drive control circuit 37 for controlling the CD-ROM drive 19b, a speaker control section 38 for controlling the voice output of the speaker 20, and a microphone control circuit 39 for controlling the voice input from the microphone 21.

The CPU 25 is connected with a clock 27 for generating a reference clock signal necessary for operating the information processing device. The CPU 25 is also connected, through the data bus 26, with an expansion slot 40 for connecting various expansion boards therewith.

An SCSI board may be connected with the expansion slot 40 to connect the floppy disk drive 15b, the hard disk device 16, the scanner 18, and the CD-ROM drive 19b with the CPU 25 through the SCSI board.

Although in the first embodiment, the floppy disk 15a and the hard disk device 16 are provided as data recording media, other recording media such as an optical magnetic disk may be used to store data. Also, the scanner 18 and the CD-ROM drive 19b are used as a data input device in the first embodiment, but, other input devices such as a still video camera, a digital camera or the like may be used. Further, output devices such as a digital copying machine may be used instead of the printer 17.

In the information processing device, the ROM 28 stores the program for a document retrieval process and that for a retrieval result display process, which will be described later. Alternatively or additionally, the recording media such as the floppy disk 15a, the hard disk device 16 or the like may store a part or the entirety of the programs, which will be read out and stored in the RAM 29 as necessary.

The information processing device having the above construction operates as described below.

Figure 3:
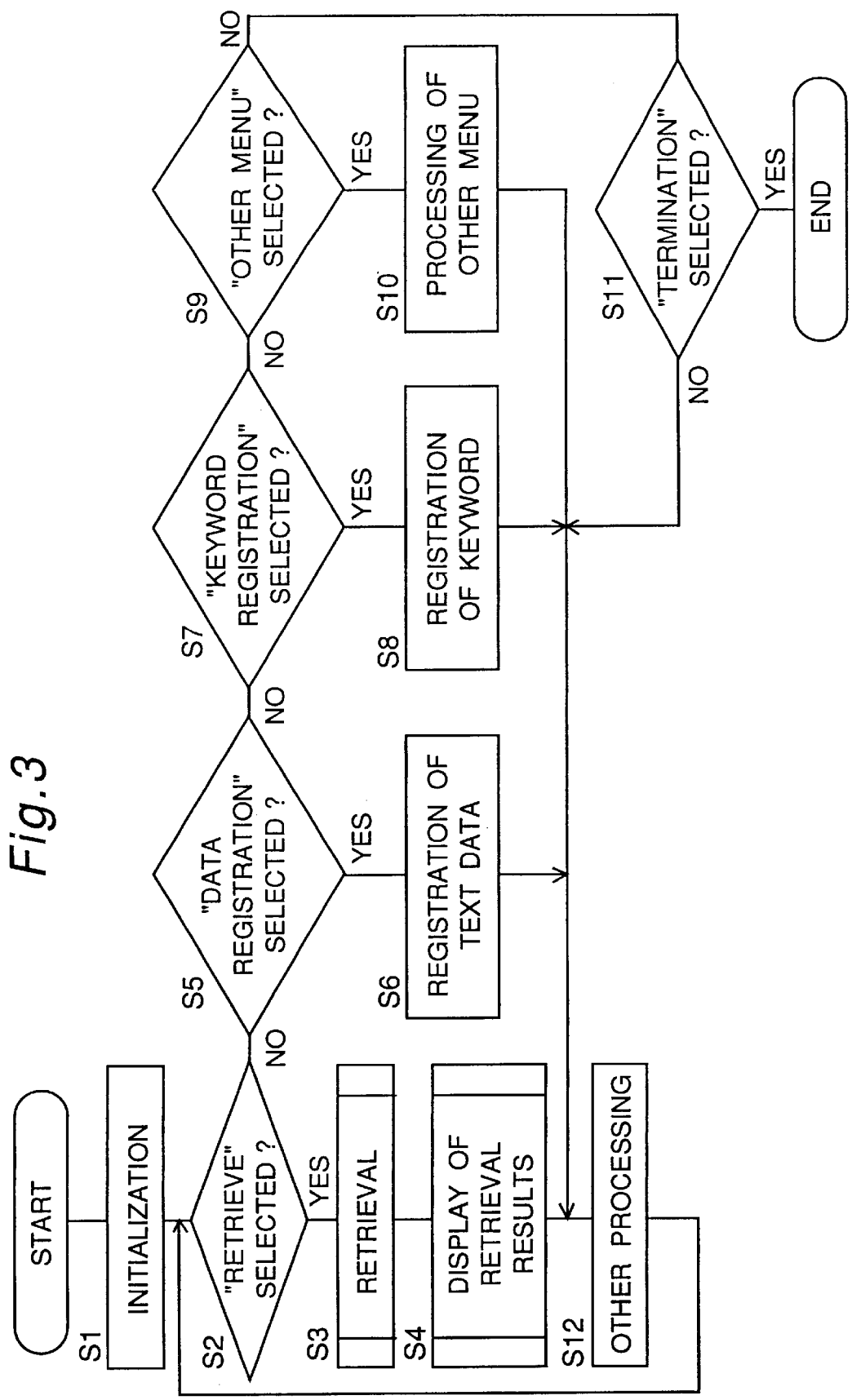
FIG. 3 is a flowchart of a main routine to be executed under control of the CPU of FIG. 2.

FIG. 3 shows a flowchart of the main routine of processing to be executed under control of the CPU 25, based on the program stored in the ROM 28.

Upon turning on the information processing device, the program starts, and at step S1, flags necessary in each processing are initialized, and initial setting such as display of an initial screen on the display 12 is executed.

If it is determined at step S2 that a job menu "retrieve" has been selected on the initial screen of the display 12, the program goes to step S3. Otherwise, the program goes to step S5.

At step S3, in accordance with the selected job menu "retrieve,", a retrieval process is performed to retrieve desired text data from a database as will be described in detail later.

Then, at step S4, based on retrieved candidate text data, processing of displaying the retrieval results, or candidate documents, on the display 12 is executed. Then, the program goes to step S12.

If it is determined at step S5 that a job menu "data registration" has been selected on the initial screen of the display 12, the program goes to step S6. Otherwise, the program goes to step S7.

At step S6, in accordance with the selected job menu "data registration", a registration process is performed to register text data input from the input device, such as the keyboard 13, the scanner 18, or the CD-ROM drive 19b, in the database. Then, the program goes to step S12.

If it is determined at step S7 that a job menu "keyword registration" has been selected on the initial screen displayed on the display 12, the program goes to step S8. Otherwise, the program goes to step S9.

At step S8, in accordance with the selected job menu "keyword registration", a keyword registration process is performed to register in a keyword dictionary a new keyword together with its degrees of similarity to other keywords. Then, the program goes to step S12.

If it is determined at step S9 that a job menu "other menu" has been selected on the initial screen of the display 12, the program goes to step S10. Otherwise, the program goes to step S11.

At step S10, in accordance with the selected job menu "other menu", other job such as printing is executed. Then, the program goes to step S12.

It is determined at step S11 whether "termination" has been selected on the initial screen of the display 12. If YES, the execution of the main routine terminates. Otherwise, the program goes to step S12.

Other processing is executed at step S12. Then, the program returns to step S2.

The "retrieval" process and the "retrieval result display" process following the "retrieval" process will be described in detail below. The processes of "text data registration", "keyword registration", "other menu", and "other processing" are performed in a manner similar to that of conventional database management systems and do not directly relate to the present invention. Therefore the detailed description thereof are omitted herein.

Figure 4:
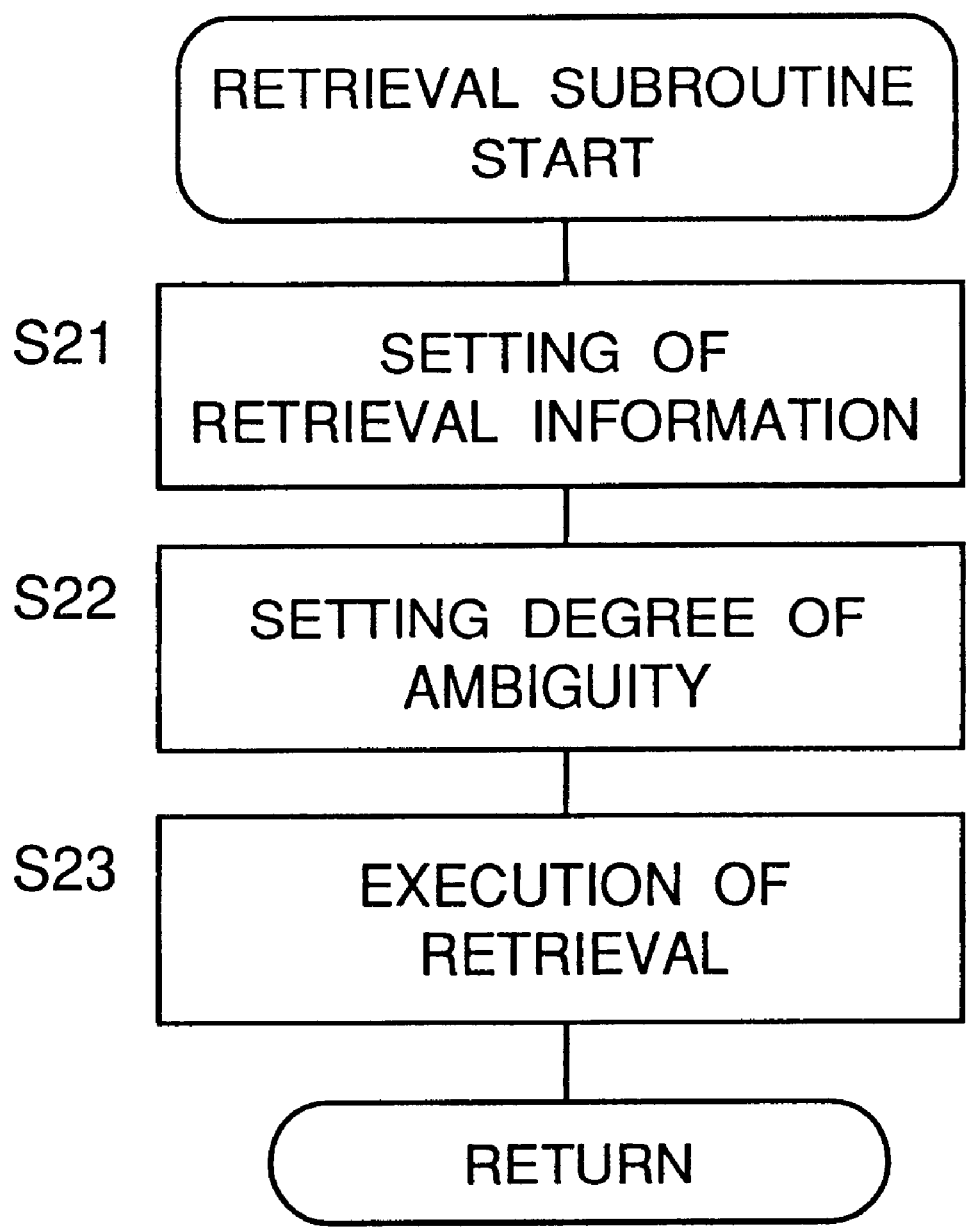
FIG. 4 is a flowchart of a retrieval subroutine.

FIG. 4 is a flowchart of the retrieval subroutine to be executed at step S3 of the main routine shown in FIG. 3.

If it is determined at step S2 of the main routine that the job menu "retrieve" has been selected, the retrieval subroutine starts.

At step S21, a keyword to be used for the retrieval is set by a user. In other words, the keyword is set as a retrieval constraint.

Then, at step S22, a degree of ambiguity x to be used for the retrieval is set by the user.

The degree of ambiguity x corresponds to the degree of inter-keyword similarity registered in the keyword dictionary along with keywords. In the information processing device of the first embodiment, definitions of the degrees of similarity are as described below. The definitions of the degrees of similarity can be set as desired and not limited to the ones described below.

Degree of similarity:

0 . . . Identical.
↑ . . . Similarity increases.
↓ . . . Similarity decreases.
1 . . . No similarity.

The degree of ambiguity x is set in the range of 0–1 in accordance with the definitions of the degrees of similarity.

At step S23, based on the keyword set at step S21 and the degree of ambiguity x set at step S22, a full text retrieval process is executed.

Specifically, reference is made to all character strings included in all text data registered in the database to check whether there are words corresponding to the set keyword and whether there are words corresponding to keywords of which the degrees of similarity d to the set keyword are equal to or lower than the set degree of ambiguity x. Then, text data including words corresponding to such keywords are retrieved as candidate documents.

When the degree of ambiguity x is set to 0, the retrieval is executed using only the set keyword. When the set degree of ambiguity x is 1, the retrieval is executed using all keywords registered in the keyword dictionary.

FIG. 5 is a flowchart of the retrieval result display subroutine to be executed at step S4 of the main routine shown in FIG. 3.

When the retrieval subroutine terminates at step S3 of the main routine shown in FIG. 3, the retrieval result display subroutine starts.

At step S31, one candidate document is selected from the candidate documents obtained as a result of the retrieval processing.

Based on the text data of the selected candidate document, one unprocessed word/phrase is selected from the candidate document. The term "word/phrase" herein means a word/phrase having a grammatical function such as noun, conjunction, a postpositive functioning as an auxiliary to a is main word, or the like, as well as a group of numbers or symbols having a particular meaning. The definition can be appropriately altered.

It is determined at step S33 whether the selected unprocessed word/phrase (referred to as simply "word/phrase" below) is in the keyword dictionary. If YES, the program goes to step S34. If NO, the program goes to step S39.

It is determined at step S34 whether the degree d of similarity to the set keyword of the word/phrase is in the range of $0 \leq d \leq 0.1$. If YES, the program goes to step S35. Otherwise, the program goes to step S36.

At step S35, the display density of the word/phrase in the candidate document is set to 100% of a normal display density. Then, the program goes to step S40.

It is determined at step S36 whether the degree d of similarity to the set keyword of the word/phrase is in the range of $0.1 < d \leq 03$. If YES, the program goes to step S37. If NO, that is, if the degree d of similarity is in the range of $0.3 < d < 1$, the program goes to step S38.

At step S37, the display density of the word/phrase of the candidate document is set to 60% of the normal display density. Then, the program goes to step S40.

At step S38, the display density of the word/phrase of the candidate document is set to 40% of the normal display density. Then, the program goes to step S40.

At step S39, the display density of the word/phrase of the candidate document is set to on 20% of the normal display density.

At step S40, the word/phrase selected at step S32 is displayed on the display 12 at the display density set at step S35, S37, S38 or S39.

The above steps are repeated until a final unprocessed word/phrase has been processed. It is determined at step S41 whether the final word/phrase of the candidate document has been displayed. If YES, the program goes to step S42. If NO, the program returns to step S32 to perform the above-described display process for the next word/phrase of the candidate document, It is determined at step S42 whether there is an unprocessed candidate document. If YES, the program returns to step S31 to perform the above-described display process for the next candidate document. On the other hand, if NO, the retrieval result display subroutine terminates. Then, the program returns to the main routine shown in FIG. 3.

As described above, the first embodiment performs an ambiguous retrieval to obtain, as a candidate document, text data including words/phrases coincident with keywords each having a degree d of similarity to the set keyword equal to or lower than the set degree of ambiguity x. If the degree d of similarity to the set keyword of a word/phrase included in the thus obtained candidate document is in the range of $0 \leq d \leq 0.1$, the word/phrase occurring in the candidate document (every occurrence) is displayed at 100% of the normal display density.

Similarly, if a word/phrase has a degree d of similarity falling in the range of $0.1 < d \leq 0.3$, the word/phrase is displayed at 60% of the normal display density. If a word/phrase has a degree d of similarity in the range of $0.3 < d \leq 1$, it is displayed at 40% of the normal display density. If a word/phrase has not been registered in the keyword dictionary, it is displayed at 20% of the normal display density.

Accordingly, when the candidate document is displayed on the display 12, words/phrases constituting the candidate document are displayed at different display densities according to their degrees of similarity to the keyword set by the user.

That is, according to the first embodiment, not only a word/phrase identical to the set keyword of the candidate document but also words/phrases related to the set keyword, if any, are displayed at densities emphatically according to their degrees of similarity to the set keyword.

Figures 6A, 6B:
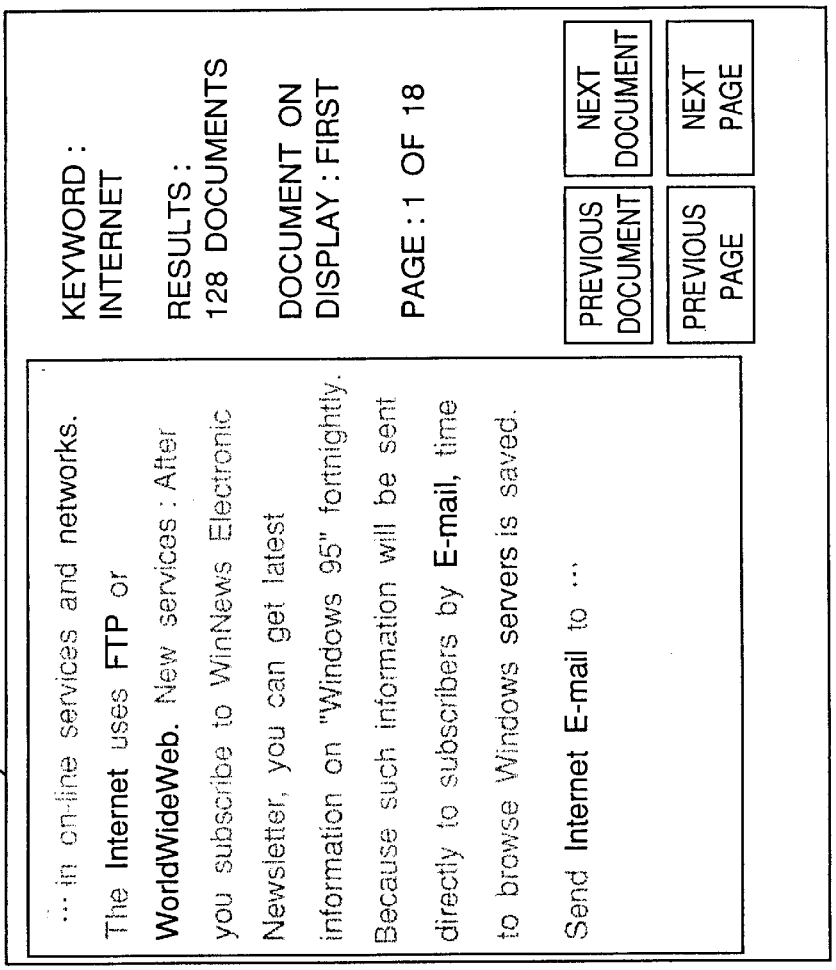
FIG. 6A conceptually shows contents of a keyword dictionary.
FIG. 6B shows an example of display of retrieval results.

FIG. 6B shows an example of display made on the display 12 in the retrieval result display process. FIG. 6A conceptually shows contents of the keyword dictionary.

For a keyword "Internet", words/phrases "WorldWideWeb", "FTP", and "E-mail" are registered in the keyword dictionary as similar keywords having degrees of similarity d in the range of $0 \leq d \leq 0.1$. Also, "Network" and "Server" are registered as similar keywords having degrees of similarity d in the range of $0.1 \leq d \leq 0.3$. Also, "On-line" is registered in the keyword dictionary as a similar keyword of $0.3<d\leq1$. When the retrieval process and the retrieval result display process are performed setting the word "Internet" as a retrieval key, the words "Internet", "WorldWideWeb", "FTP", and "E-mail" occurring on the first page of the first candidate document are displayed on the display 12 at a display density of 100%, and the words "Network" and "Server" are displayed at a display density of 60%, as shown in FIG. 6B.

Information such as the set keyword, the number of retrieved documents, a document number of a displayed candidate document, and a page number of a displayed page, are displayed on the display 12 in addition to the candidate document. Icons for changing documents and pages are also displayed on the display 12.

In the first embodiment, the degrees Of similarity d of each keyword are divided into three classes, namely, $0\leq d\leq0.1$, $0.1\leq d\leq0.3$, and $0.3<d\leq1$. However, the number of classes is not limited to three, and the thresholds of each class are not limited to the above values, but any desired values is can be adopted. The set value of the display density of each class can also be selected as desired.

Further, in the first embodiment, similar keywords in the candidate document are displayed at display densities according to degrees d of similarity to the set keyword. But the present invention is not limited to the display manner. For example, both the set keyword and the similar keywords may be displayed at the same display density of 100%.

Further, instead of changing the display density, it is possible to change the font, the display color, or the display point of the set keyword and the similar keywords in the candidate document so as to be distinguished from the other character strings.

In the first embodiment, the retrieval of data constituted of only character strings has been exemplified. But the present invention is not limited to this, but applicable to retrieval of character strings which constitute comments and captions annexed to image data, audio data or multi-media data consisting of the combined image data and audio data.

Also, in the first embodiment, the ambiguous retrieval process based on the set keyword and the keywords similar thereto has been described as an example. But the present invention is also applicable to a normal retrieval process based on only the set keyword.

<First Modification>

Such a retrieval process based on only the set keyword is executed basically in the same procedure as that of the retrieval subroutine shown in FIG. 4. But in this case, the retrieval of text data including the same word/phrase as the set keyword is executed in the retrieval process to be executed at step S23. That is, in the retrieval process, keywords (similar keyword) associated with the set keyword are not considered.

FIG. 7 is a flowchart of a retrieval result display subroutine for documents retrieved by means of the retrieval process based on only the set keyword.

Similarly to the operation to be performed at steps S31–S33 of the flowchart of FIG. 5, at steps S51–S53, one candidate document is selected, one unprocessed word/phrase is selected from the candidate document, and then it is determined whether the selected word/phrase has been registered in the keyword dictionary. If YES, the program goes to step S54. If NO, the program goes to step S60.

It is determined at step S54 whether or not the degree d of similarity to the set keyword of the selected word/phrase is equal to or lower than the degree of ambiguity x set at step S22 of the flowchart shown in FIG. 4. If YES ($d\leq x$), the program goes to step S55. Otherwise, the program goes to step S60.

Similarly to the operation of steps S34–S42 of FIG. 5, at steps S55–S63, if the degree of similarity d of the word/phrase to the set keyword is in the range of $0\leq d\leq0.1$, the word/phrase (every occurrence) in the candidate document is displayed at a display density of 100%. If the degree of similarity d of the word/phrase to the set keyword is in the range of $0.1<d\leq0.3$, the word/phrase is displayed at a display density of 60%. If the degree of similarity d of the word/phrase is in the range of $0.3<d\leq1$, the word/phrase is displayed at a display density of 40%. Also, if the degree of similarity d of the word/phrase is greater than the degree of ambiguity x or if the word/phrase has not been registered in the keyword dictionary, the word/phrase is displayed at a display density of 20%.

When the processing of all candidate documents terminates, the program returns to the main routine.

As described above, when the retrieval process is executed using only the set keyword, the degree of ambiguity x is checked during the retrieval result display process. Accordingly, when the degree of ambiguity x=0.4 for example, a word/phrase having a degree of similarity d=0.45 (>x) is displayed at a display density of 20% through steps S54 and S60 of the flowchart of FIG. 7.

On the other hand, when the ambiguous retrieval is executed in the retrieval process as in the first embodiment, the word/phrase having the degree of similarity d=0.45 (>x) is displayed at a display density of 40% through steps S36 and S38 of the flowchart of FIG. 5.

The first embodiment and the first modification have been described taking the full text retrieval for example. This is not limitative, but the present invention is also applicable to retrieval based on the keywords annexed to the text data, as described next.

<Second Modification>

When retrieval is performed based on the keyword annexed to the text data, a plurality of keywords are annexed to each text data as attribute information in advance, and the keywords are registered in the database in association with one another. The keywords annexed to the text data are arbitrary words/phrases included in the text data. Generally, words/phrases having a meaning representatively indicating the contents of the text data are selected.

The basic processing of the information processing device of the second modification is fundamentally the same as that of the information processing device of the first embodiment and executed in accordance with the flowchart shown in FIG. 3.

In the text data registration process to be executed at step S6, however, keywords are annexed to the input text data as attribute information and registered in the database together with the input text data.

The retrieval process is fundamentally the same as that of the first embodiment and executed in accordance with the flowchart shown in FIG. 4.

In the retrieval information setting process at step S21 of FIG. 4, however, a list of the keywords stored in the keyword dictionary is displayed on the display 12. A user sets a desired keyword, making reference to the keyword list. Further, the retrieval process at step S23 of FIG. 4 retrieves text data having, as attribute information, a keyword of which the degree of similarity d to the keyword set at step S21 is equal to or lower than the degree of ambiguity x.

A retrieval result display process is performed as follows in accordance with a subroutine shown in FIG. 8.

At step S71, one candidate document is selected from candidate documents obtained as a result of the ambiguous retrieval.

At step S72, one unprocessed keyword is selected from keywords annexed to the selected candidate document.

It is determined at step S73 whether the selected keyword has been registered in the keyword dictionary. If YES, the program goes to step S74. If NO, the program goes to step is S79.

Operations similar to the operations of steps S34–S40 of the retrieval result display subroutine shown in FIG. 5 are performed at steps S74–S80. If the degree of similarity d of the selected keyword to the set keyword is in the range of $0 \leq d \leq 0.1$, every word/phrase in the candidate document corresponding to this keyword is displayed at a display density of 100%. If the degree of similarity d of the selected keyword is in the range of $0.1 < d \leq 0.3$, the word/phrase corresponding to this selected keyword is displayed at a display density of 60%. If the degree of similarity d of the selected keyword is in the range of $0.3 < d \leq 1$, the word/phrase corresponding to this keyword is displayed at a display density of 40%. If the selected keyword has not been registered in the keyword dictionary, the word/phrase corresponding to this keyword is displayed at a display density of 20%.

It is determined at step S81 whether acll the keywords annexed to the candidate document selected at step S71 have been displayed. If YES, the program goes to step S82. On the other hand, if NO, the program returns to step S72 to perform a display process for the next keyword of the candidate document.

At step S82, undisplayed characters and symbols included in the selected candidate document, namely, words/phrases other than the keywords are displayed at a display density of 20% of the normal display density.

It is determined at step S83 whether there are unprocessed candidate documents. If YES, the program returns to step S71 to perform the display processing for the next candidate document. If NO, the retrieval result display subroutine terminates and the program returns to the main routine.

As described above, in the second modification, if the keywords annexed to the candidate document as attribute information include a keyword or keywords similar to the set keyword, the candidate document is displayed in such a manner that not only a word/phrase corresponding to the set keyword but also words/phrases corresponding to the similar keywords are emphatically displayed according to their degrees of similarity to the set keyword.

Second Embodiment

An information processing device of a second embodiment has substantially the same hardware construction as that of the first embodiment shown in FIGS. 1 and 2. Thus, the description on the hardware construction of the first embodiment is applied to the second embodiment, and reference is made to FIGS. 1 and 2 as necessary in the following description.

In this second embodiment, the hard disk device 16 stores objects together with their attribute information. The following description on the second embodiment is centered on contents of processing performed in the case where objects to be retrieved are image data and keywords are used as attribute information.

Figure 9:
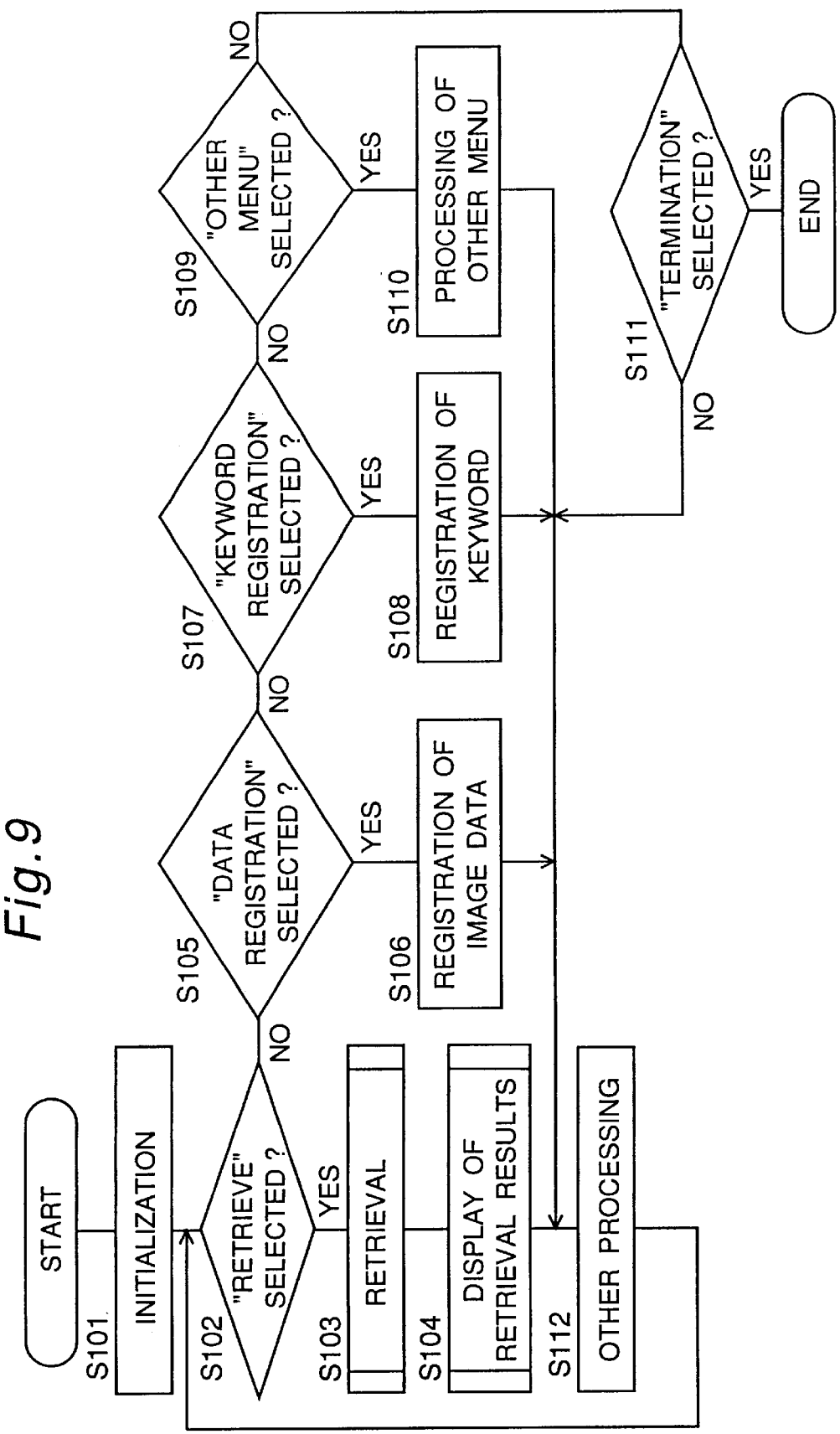
FIG. 9 is a flowchart of another main routine to be executed in an information processing device according to a second embodiment of the present invention.

FIG. 9 shows a flowchart of the main routine of processing to be executed under control of the CPU 25 of the information processing device of this embodiment, based on the program stored in the ROM 28.

Upon turning on the information processing device, the program starts, and at step S101, flags necessary in each processing are initialized, and initial setting such as display of an initial screen on the display 12 is executed.

If it is determined at step S102 that a job menu "Nretrieve" has been selected on the initial screen of the display 12, the program goes to step S103. Otherwise, the program goes to step S105.

At step S103, in accordance with the selected job menu "retrieve", a retrieval process is performed to retrieve desired image data with equivocation or ambiguity from a database, as will be described in detail later.

Then, at step S104, based on retrieved candidate image data, processing of displaying the retrieval results, or candidate images, on the display 12 is executed. Then, the program goes to step S112.

If it is determined at step S105 that a job menu "data registration" has been selected on the initial screen of the display 12, the program goes to step S106. Otherwise, the program goes to step S107.

At step S106, in accordance with the selected job menu "data registration", an image data registration process is performed to store image data input from the input device, such as the keyboard 13, the scanner 18, or the CD-ROM drive 19b, with keywords annexed to the image data, in the database. Then, the program goes to step S112.

If it is determined at step S107 that a job menu "keyword registration" has been selected on the initial screen displayed on the display 12, the program goes to step S108. Otherwise, the program goes to step S109.

At step S108, in accordance with the selected job menu "keyword registration", a keyword registration process is performed to register in a keyword dictionary a new keyword together with its degrees of similarity to other keywords. Then, the program goes to step S112.

If it is determined at step S109 that a job menu "other menu" has been selected on the initial screen of the display 12, the program goes to step S110. Otherwise, the program goes to step S111.

At step S110, in accordance with the selected job menu "other menu", other job such as printing is executed. Then, the program goes to step S112.

It is determined at step S111 whether "termination" has been selected on the initial screen of the display 12. If YES, the execution of the main routine terminates. Otherwise, the program goes to step S112.

Other processing is executed at step S112. Then, the program returns to step S102.

The "retrieval" process and the "retrieval result display" process following the "retrieval" process will be described in detail below. The processes of "image data registration", "keyword registration", "other menu", and "other processing" are performed in a manner similar to that of conventional database management systems and do not directly relate to the present invention. Therefore the detailed description thereof are omitted herein.

Figure 10:
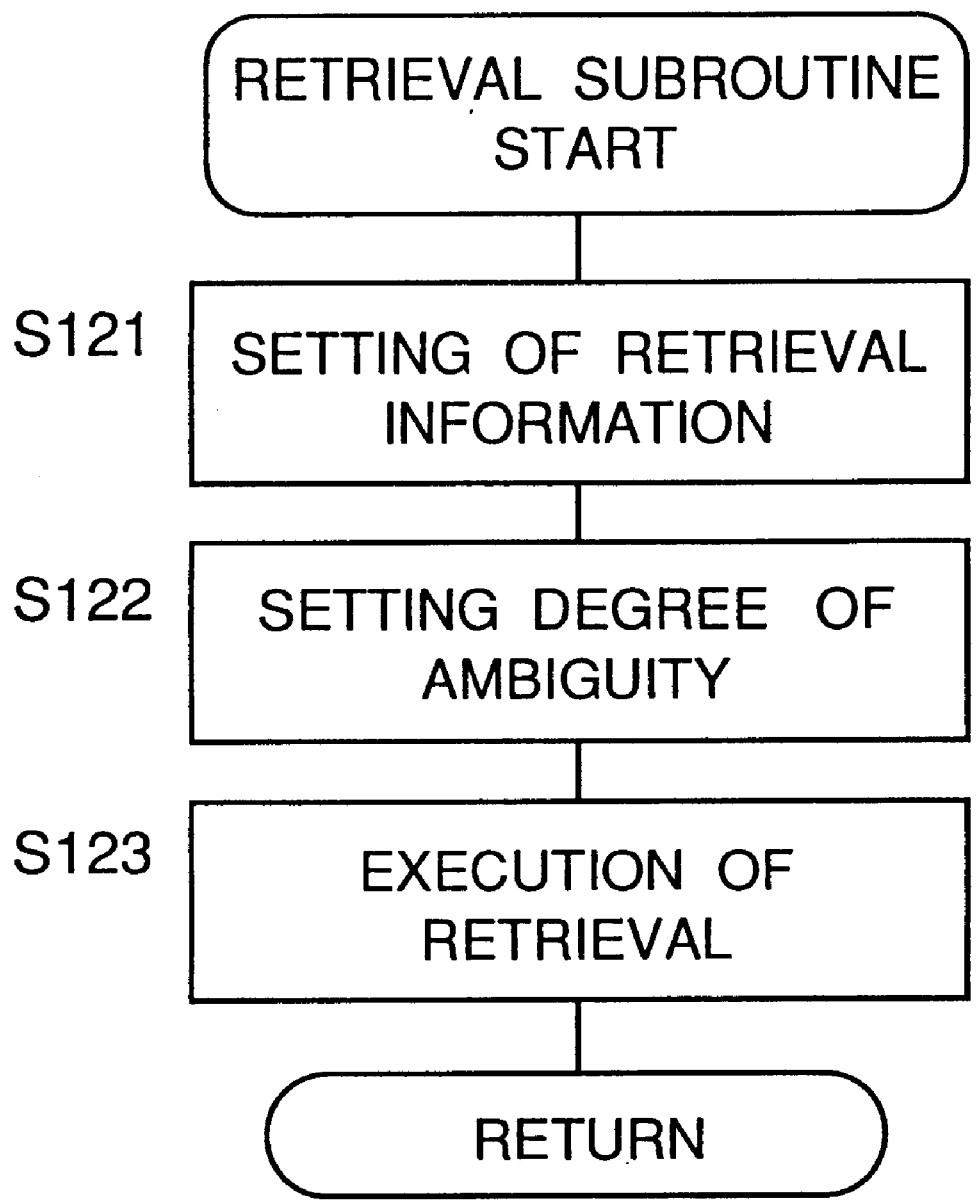
FIG. 10 is a flowchart of a retrieval subroutine to be executed in the main routine shown in FIG. 9.

FIG. 10 is a flowchart of the retrieval subroutine to be executed at step S103 of the main routine shown in FIG. 9.

If it is determined at step S102 of the main routine that the job menu "retrieve" has been selected, the retrieval subroutine starts.

At step S121, a list of the keywords stored in the keyword dictionary is shown on the display 12, and a user sets a keyword to be used for the retrieval, making reference to the is keyword list.

Then, at step S122, a degree of ambiguity x to be used for the retrieval is set by the user.

The degree of ambiguity x corresponds to the degree of inter-keyword similarity registered in the keyword dictionary along with keywords. In the information processing device of the second embodiment, definitions of the degrees of similarity are as described below. The definitions of the degrees of similarity can be set as desired and not limited to the ones described below.

Degree of similarity:

0 . . . Identical.
↑. . . Similarity increases.
↓. . . Similarity decreases.
1 . . . No similarity.

The degree of ambiguity x is set in the range of 0–1 in accordance with the definitions of the degrees of similarity At step S123, based on the keyword set at step S121 and the degree of ambiguity x set at step S122, the following keyword retrieval process is executed.

Specifically, keywords similar to the set keyword, namely, keywords whose degrees of similarity to the set keyword are equal to or lower than the set degree of ambiguity x, are retrieved from the keyword dictionary. Then, images having a keyword coinciding with any of the keywords retrieved from the keyword dictionary are retrieved as retrieval results (candidate images).

When the degree of ambiguity x is set to 0, the retrieval is executed using only the set keyword. When the set degree of ambiguity x is 1, the retrieval is executed using all keywords registered in the keyword dictionary.

Figure 11:
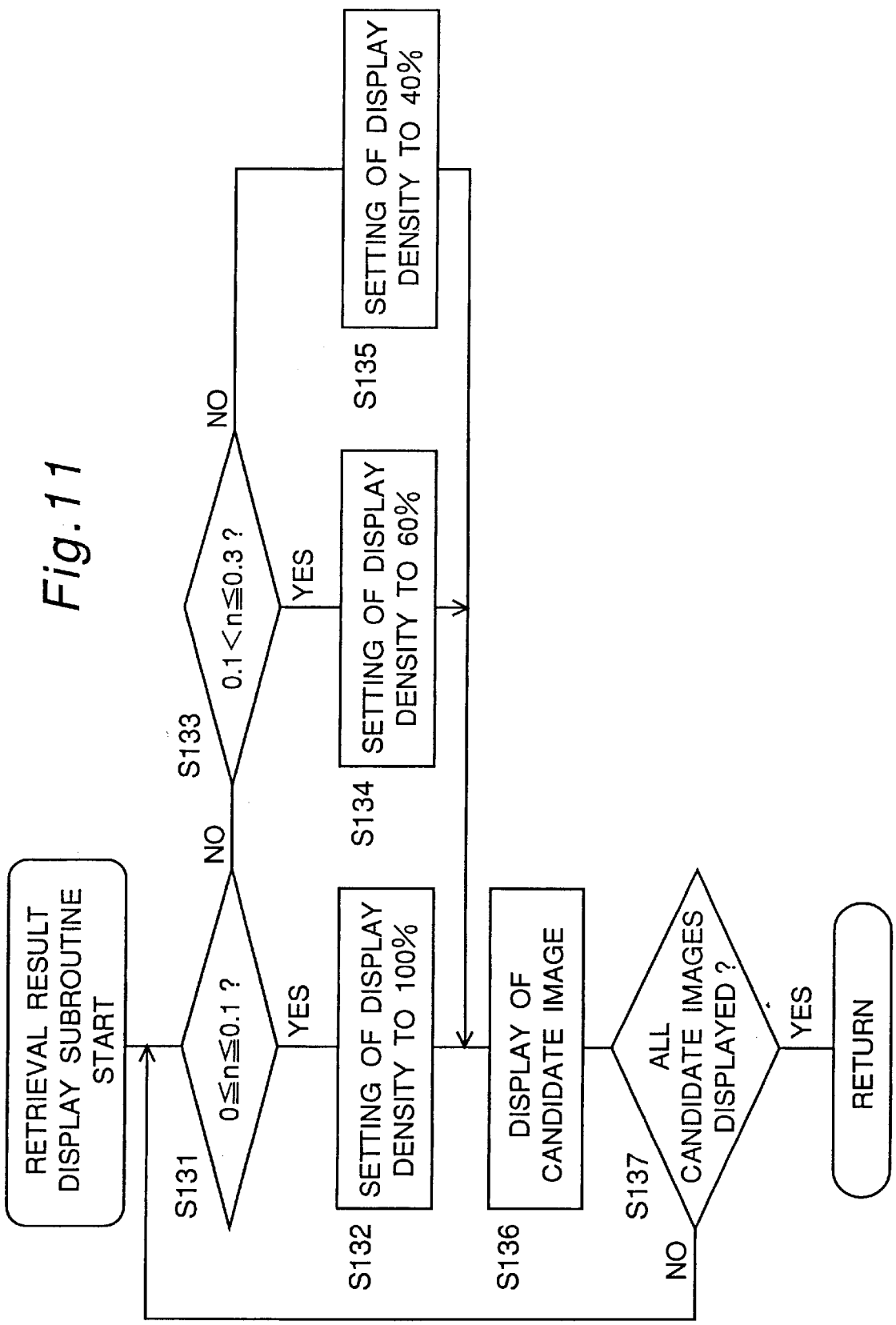
FIG. 11 is a flowchart of a retrieval result display subroutine to be executed in the main routine shown in FIG. 9.

FIG. 11 is a flowchart of the retrieval result display subroutine to be executed at step S104 of the main routine shown in FIG. 9.

When the retrieval subroutine terminates at step S103 of the main routine, the retrieval result display subroutine starts.

At step S131, one candidate image is selected from the candidate images obtained as a result of the retrieval process. Then, it is determined whether a degree of similarity n of the candidate image is in the range of $0 \leq n \leq 0.1$. If YES, the program goes to step S132. Otherwise, the program goes to step S133.

The "degree of similarity n" of a candidate image is defined as a "degree of similarity d to a set keyword" of the keyword annexed to the candidate image. If a plurality of keywords are annexed to the candidate image, a minimum value of the degrees of similarity d of all the keywords (i.e., the degree of similarity d of the most similar keyword) is used.

At step S132, the display density of a display region for a current candidate image selected at step S131 is set to 100% of a normal display density. Then, the program goes to step S136.

It is determined at step S133 whether the degree of similarity n of the current candidate image is $0.1 < n \leq 0.3$. If YES, the program goes to step S134, at which the display density of the display region for the current candidate image is set to 60% of the normal display density. Then, the program goes to step S136. On the other hand, if NO at step S133, that is, when the degree of similarity n of the current candidate image is $0.3 < n \leq 1$, the program goes to step S135 at which the display density of the display region for the candidate image is set to 40% of the normal display density. Then, the program goes to step S136.

At step S136, image data of the candidate image is read out, and the candidate image is displayed on the display 12 at the display density set at step S132, S134 or S135.

It is determined at step S137 whether all candidate images have been displayed. If NO, the program returns to step S131 to perform a display process for the next candidate image afresh. On the other hand, if all candidate images have been displayed, the retrieval result display subroutine terminates, and the program returns to the main routine shown in FIG. 9.

As described above, the second embodiment performs an ambiguous retrieval to extract, as a candidate image, image data to which is annexed at least one keyword whose degree of similarity d to a set keyword is equal to or lower than a set degree of ambiguity x. If the degree n of similarity of the candidate image (a minimum one among degrees of similarity d of the keywords annexed to the candidate image) obtained as a result of the ambiguous retrieval is in the range of $0 \leq n \leq 0.1$, the candidate image is displayed at 100% of the normal display density. If the degree of similarity of the candidate image is in the range of $0.1 < n \leq 0.3$, the candidate image is displayed at 60% of the normal display density. If the degree of similarity n of the candidate image is in the range of $0.3 < n \leq 1$, the candidate image is displayed at 40% of the normal display density.

Figure 12:
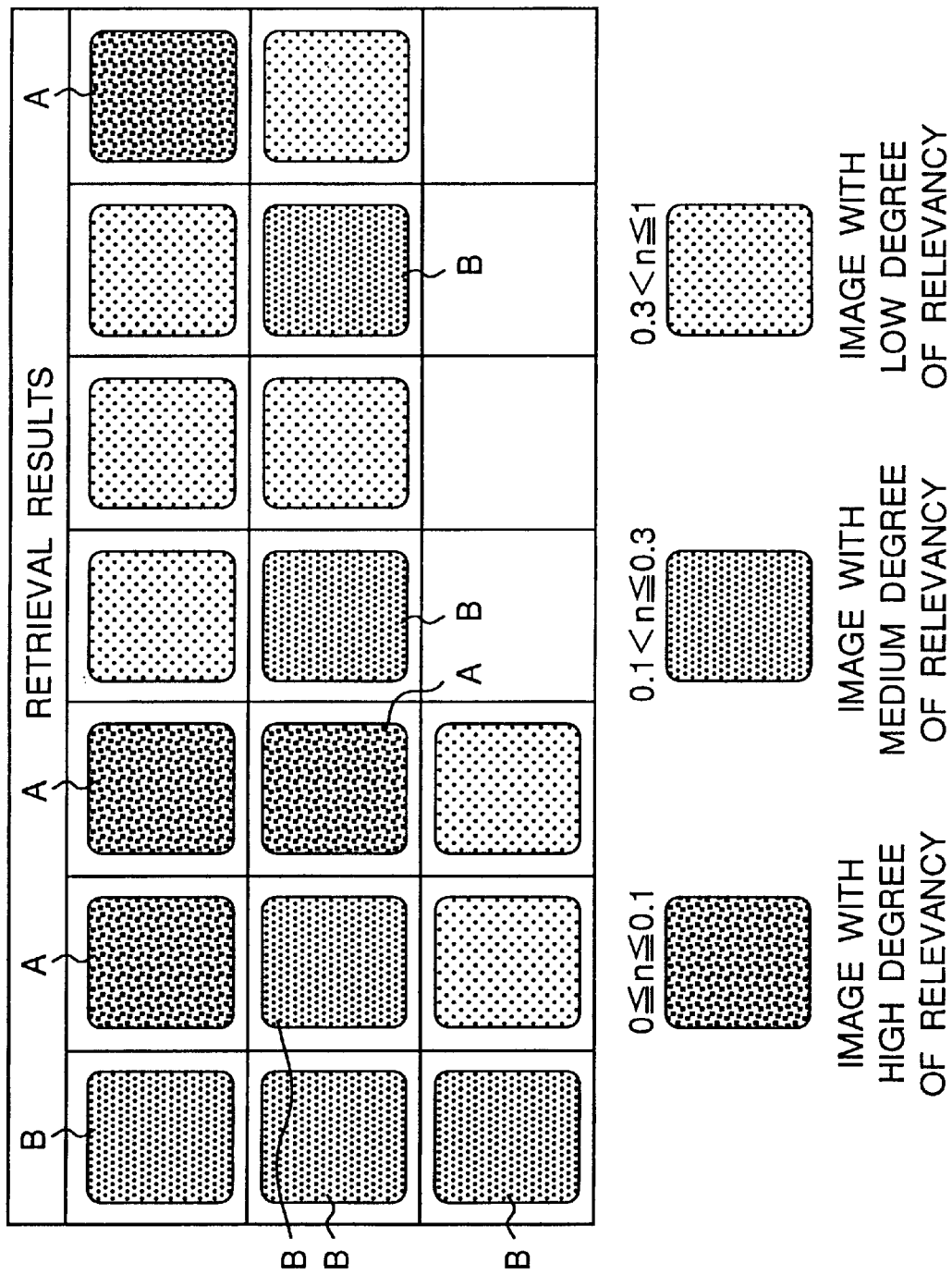
FIG. 12 shows an example of display of candidate images.

Accordingly, as shown in FIG. 12, a region A of a highly relevant candidate image having a degree of similarity n of $0 \leq n \leq 0.1$ is displayed at a high density, a region B of a candidate image of medium relevancy having a degree of similarity n of $0.1 < n \leq 0.3$ is displayed at an intermediate density, and a region of a candidate image of low relevancy having a degree of similarity n of $0.3 < n \leq 1$ is displayed at a low density.

That is, in the second embodiment, the display density of the displayed image allows the user to recognize the degree of similarity of the attribute information (keyword) of the candidate image to the retrieval constraint (set keyword) at a glance. Therefore, it is possible to find a desired image rapidly even though a large number of candidate images are displayed at random. It is also possible to recognize the distribution for each degree of similarity of the candidate images at a glance. For example, referring to FIG. 12, it is possible to recognize at a glance that four of the candidate images have a degree of similarity n in the range of $0 \leq n \leq 0.1$, that six of the candidate images have a degree of similarity n in the range of $0.1 < n \leq 0.3$, and that seven of the candidate images have a degree of similarity n in the range of $0.3 < n \leq 1$. Accordingly, the user can easily find that setting of the degree of ambiguity x to 0.1 (x=0.1) for the next retrieval process will restrict the candidate images to four.

If additional data such as a registration date, an author's name, and the like are annexed to image data as pieces of attribute information, and if candidate images are sorted using any of the additional data, a position in which each candidate image should be displayed on the screen may be changed, but the display densities of the candidate images are not varied. Accordingly, the degrees of similarity between the attribute information of the candidate images and the retrieval constraint, or retrieval condition, can be recognized at a glance even though the candidate images are sorted using any kind of attribute information.

In the second embodiment, the degrees of similarity n of candidate images are divided into three classes, namely, $0 \leq n \leq 0.1$, $0.1 < n \leq 0.3$, and $0.3 < n \leq 1$. The number of classes is not limited to three, and the thresholds of each class are not limited to the above values.

Further, in the second embodiment, candidate images are displayed on the display 12 at display densities according to the degrees of similarity n thereof. But this manner of display is not limitative. For example, instead of changing the display density, a thickness of an image frame may be changed according to the degree of similarity n, as shown in FIG. 13, in displaying the candidate image. It is also possible to arrange the information processing device to selectively alter the display density and the thickness of the Frame of the candidate image in displaying the candidate image.

In the second embodiment, the ambiguous retrieval based on keywords annexed to static image data has been described above. However, the present invention is not limited to this, but is also applicable to an ambiguous retrieval based on keywords annexed to dynamic image data, text data, audio data, and multimedia data consisting of these data combined with one another. In the case of the dynamic image data, degrees of similarity n of candidate images are indicated by changing stepwise the display density or frame thickness of one scene of each candidate image. In the case of the text data, degrees of similarity n can be indicated by changing stepwise the splay density, frame thickness, character thickness, or font. In the case of the audio data, degrees of similarity n can be displayed by changing stepwise the sound volume or fundamental frequency.

Furthermore, in the described ambiguous retrieval process of the second embodiment, the degree of similarity d is based on attribute information such as the keyword or the like annexed to image data. Alternatively, the degree of similarity d may be based on an amount of features extracted from the media data, feature information of the media data (for example, tone of image, contour of image, etc.), or the like.

<Modification>

The information processing device can be modified such that degrees of similarity based on image data features are directly given to respective image data to execute an ambiguous retrieval of similar or analogous objects by using these degrees of similarity given to the image data. In such a modification, when input image data are registered, a degree of similarity between the input image data and an already-registered image data is also stored. This degree of similarity may be manually set by an operator comparing images corresponding to both image data. Alternatively, it may be automatically set by detecting the tones, for example, of both images on the basis of both image data, and then calculating the distance between both images within a color space on the basis of the detected tones.

By using a set image data and a set degree of ambiguity x as retrieval constraints and referring to the degrees of similarity of the registered image data, similar images are retrieved and displayed. The display density of each candidate image is set according to the degree of similarity of the candidate image.

Operations of this modification are basically the same as those of the second embodiment device using the keyword, and performed in accordance with the main routine shown in FIG. 9, the retrieval subroutine shown in FIG. 10, and the retrieval result display subroutine shown in FIG. 11, except for the following.

In the image data registration process at step S106 in the main routine shown in FIG. 9, when input image data is stored, the degrees of similarity between this input image data and previously registered image data are set and stored.

Step 107 for determining about selection or non-selection of the menu item "keyword registration" and step S108 for the keyword registration process in the main routine shown in FIG. 9 may be eliminated, but are required when the retrieval processing is performed using keywords as well.

In the retrieval information setting process performed at step S121 of the retrieval subroutine shown in FIG. 10, an image data to be used as a retrieval constraint is set. To this end, the image data may be designated by specifying its name or may be selected from a list of images displayed on the screen. Further, the retrieval process at step S123 is performed to retrieve image data of which the degree of similarity to the image data set at step S121 is equal to or lower than the degree of ambiguity x set at step S122.

Also, at discrimination steps S131 and S133 for determining the degree of similarity n in the retrieval result display subroutine shown in FIG. 11, the degree of similarity between the candidate image data and the set image data is used as the degree of similarity n of the candidate image.

As described above, according to this modification, a degree of similarity is given not to attribute information annexed to the image data (objects) but directly to the image data, and images are retrieved using the degrees of similarity given to the respective image data. Attribute information to be annexed to the image dada is set by the user and therefore tends to include subjective factors. To the contrast, in the modification, such subjective factors can be eliminated especially when the degrees of similarity are automatically set, so that it is possible to retrieve similar images as objectively as possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing device for retrieving and displaying desired objects from a database wherein a plurality of objects including text data are registered, said information processing device comprising:

setting means for setting a keyword as a retrieval constraint;

retrieval means for retrieving, from the database, objects containing a word/phrase corresponding to the keyword set by the setting means or a word/phrase related to this keyword; and processing means for performing a process to display the objects retrieved by the retrieval means such that in each retrieved object, each word/phrase corresponding to the keyword set by the setting means and each word/phrase which is related to this keyword is displayed in a manner which is different than a manner in which words, included in the respective retrieved object, that do not relate or correspond to this keyword are displayed, wherein the manner in which each word/phrase corresponding to this keyword and each word/phrase related to this keyword is displayed is in accordance with a respective degree of similarity to this keyword.

2. A device in accordance with claim 1, wherein each word/phrase corresponding to the keyword and each word/phrase related to the keyword is displayed at a display density which corresponds stepwise to the respective degree of similarity to the keyword.

3. A device in accordance with claim 2, further comprising a storage means for storing a plurality of keywords for use as retrieval constraints and for storing degrees of similarity between each of the plurality of keywords, wherein said processing means determines each respective degree of similarity to said set keyword based on the degrees of similarity stored in the storage means.

4. An information processing method for retrieving and displaying desired objects from a database wherein a plurality of objects including text data are registered, said information processing method comprising the steps of:

setting a keyword as a retrieval constraint;

retrieving, from the database, objects containing a word/phrase corresponding to the keyword set in the step of setting or a word/phrase related to this keyword; and performing a process to display the objects retrieved in the step of retrieving such that in each retrieved object, each word/phrase corresponding to the keyword set in the step of setting and each word/phrase which is related to this keyword is displayed in a manner which is different than a manner in Which words, included in the respective retrieved object, that do not relate or correspond to the keyword are displayed, wherein the manner in which each word/phrase corresponding to the keyword and each word/phrase related to the keyword is displayed is in accordance with a respective degree of similarity to the keyword.

5. A method mn accordance with claim 4, wherein each word/phrase corresponding to the keyword and each word/phrase related to this keyword is displayed at a display density which corresponds stepwise to the respective degree of similarity to the keyword.

6. A computer program product which is recorded on a recording medium and which is executable by a computer for retrieving and displaying desired objects from a database, wherein a plurality of objects including text data are registered in the database, said computer program product comprising:

setting means for setting a keyword as a retrieval constraint;

retrieval means for retrieving, from the database, objects containing a word/phrase corresponding to the keyword set by the getting means or a word/phrase related to this keyword; and processing means for performing a process to display the objects retrieved by the retrieval means such that in each retrieved object, each word/phrase corresponding to the keyword set by the setting means and each word/phrase which is related to the keyword is displayed in a manner which is different than a manner in which words, included in the respective retrieved object, that do not relate or correspond to the keyword are displayed, wherein the manner in which each word/phrase corresponding to the keyword and each word/phrase related to the keyword is displayed is in accordance with a respective degree of similarity to the keyword.

7. A computer program product in accordance with claim 6, wherein each word/phrase corresponding to the keyword and each corresponds stepwise to the respective degree of similarity to the keyword.

8. An information processing device for retrieving and displaying desired objects from a database wherein a plurality of objects are registered with pieces of attribute information, said information processing device comprising setting means for setting a piece of attribute information as a retrieval constraint;

retrieval means for retrieving, from the database, objects based on the piece of attribute information set by the setting means; and processing means for performing, a process to display each object retrieved by the retrieval means in a manner according to a respective degree of similarity between pieces of attribute information annexed to the respective retrieved object and the piece of attribute information set by the setting means.

9. A device in accordance with claim 8, further comprising a storage means for storing a plurality of pieces of attribute information and for storing degrees of similarity between each of the plurality of pieces of attribute information, wherein said processing means determines each respective degree of similarity between the pieces of attribute information annexed to the respective retrieved object and the piece of attribute information set by the setting means based on the degrees of similarity stored in the storage means.

10. A device in accordance with claim 8, wherein each retrieved object is displayed at a display density which corresponds stepwise to the respective degree of similarity.

11. A device in accordance with claim 8, wherein each retrieved object is displayed with a frame having a thickness which corresponds stepwise to the respective degree of similarity.

12. An information processing method for retrieving and displaying, desired objects from a database wherein a plurality of objects are registered with pieces of attribute information, said information processing method comprising the steps of:

setting a piece of attribute information as a retrieval constraint;

retrieving, from the database, objects based on the piece of attribute information set In the step of setting; and performing a process to display each object retrieved in the step of retrieving in a manner according to a respective decree of similarity between pieces of attribute information annexed to the respective retrieved object and the piece of attribute information set in the step of setting.

13. A method in accordance with claim 12, wherein each retrieved object is displayed at a display density which corresponds stepwise to the respective degree of similarity.

14. A method in accordance with claim 12, wherein each retrieved object is displayed with a frame having a thickness which corresponds stepwise to the respective degree of similarity.

15. A computer program product which is recorded on a recording medium and which is executable by a computer for retrieving and displaying desired objects from a database, wherein a plurality of objects are registered in the database with pieces of attribute information, said computer program product comprising:

setting means for setting a piece of attribute information as a retrieval constraint;

retrieval means for retrieving, from the database, objects based on the piece of attribute information set by the setting means; and processing means for performing a process to display each object retrieved by the retrieval means in a manner according to a respective degree of similarity between pieces of attribute information annexed to the respective retrieved object and the piece of attribute information set by the setting means.

16. A computer program product in accordance with claim 15, wherein each retrieved object is displayed at a display density which corresponds stepwise to the respective degree of similarity.

17. A computer program product in accordance with claim 15, wherein each retrieved object is displayed with a frame having a thickness which corresponds stepwise to the respective degree of similarity.

18. An information processing device for retrieving and displaying desired objects from a database wherein a plurality of objects are registered, said information processing device comprising:

setting means for setting an object as a retrieval constraint;

retrieval means for retrieving, from the database, objects based on the object set by the setting means; and processing means for performing a process to display each object retrieved by the retrieval means in a manner according to a respective degree of similarity between the respective retrieved object and the object set by the setting means.

19. A device in accordance with claim 18, further comprising a storage means for storing degrees of similarity between each of the plurality of objects registered in the database, wherein said processing means determines each respective degree of similarity between the objects retrieved by the retrieval means and the object set by the setting means, based on the degrees of similarity stored in the storage means.

20. A device in accordance with claim 18, wherein each retrieved object is displayed at a display density which corresponds stepwise to the respective degree of similarity.

21. A device in accordance with claim 18, wherein each retrieved object is displayed with a frame having a thickness which corresponds stepwise to the respective degree of similarity.

22. An information processing method for retrieving and displaying desired objects from a database wherein a plurality of objects are registered, said information processing method comprising the steps of:

setting an object as a retrieval constraint;

retrieving, from the database, objects based on the object set in the step of setting; and performing a process to display each object retrieved in the step of retrieving in a manner according to a respective degree of similarity between the respective retrieved object and the object set in the step of setting.

23. A method in accordance with claim 22, wherein each retrieved object is displayed at a display density which corresponds stepwise to the respective degree of similarity.

24. A method in accordance with claim 22, wherein each retrieved object is displayed with a frame having a thickness which corresponds stepwise to the respective degree of similarity.

25. A computer program product which is recorded on a recording medium and which is executable by a computer for retrieving and displaying desired objects from a database, wherein a plurality of objects are registered in the database, said computer program product comprising:

setting means for setting an object as a retrieval constraint;

retrieval means for retrieving, from the database, objects based on the object set by the setting means; and processing means for performing a process to display each retrieved object retrieved by the retrieval means in a manner according to a respective degree of similarity between the respective retrieved object and the object set by the setting, means.

26. A computer program product in accordance with claim 25, wherein each retrieved object is displayed at a display density which corresponds stepwise to the respective degree of similarity.

27. A computer program product in accordance with claim 25, wherein each retrieved object is displayed with a frame having a thickness which corresponds stepwise to the respective degree of similarity.

* * * * *

UNITED STATES PATENT AND TRADEMARK OFFICE
CERTIFICATE OF CORRECTION

PATENT NO. : 6,330,576 B1
DATED : December 11, 2001
INVENTOR(S) : Takatoshi Mochizuki et al.

It is certified that error appears in the above-identified patent and that said Letters Patent is hereby corrected as shown below:

Column 1,
Line 23, delete "string) ,", and insert -- string), --.
Line 39, after "contents", delete "is".

Column 2,
Line 26, delete "is It is", and insert -- It is --.
Line 44, delete "with out", and insert -- without --.
Line 53, delete "is".

Column 3,
Line 28, after "degrees", delete ",".

Column 5,
Line 29, delete "aRAM", and insert -- a RAM --.

Column 6,
Line 19, after "retrieve", delete ",".

Column 7,
Line 32, delete "dto", and insert -- d to --.

Column 8,
Line 5, delete "0.3<d<1", and insert -- $0.3 < d \leq 1$ --.
Line 67, delete "$0.1 \leq d \leq 0.3$", and insert -- $0.1 < d \leq 0.3$ --.

Column 9,
Line 15, delete "Of", and insert -- of --.
Line 17, delete "$0.1 \leq d \leq 0.3$", and insert -- $0.1 < d \leq 0.3$ --.

Column 11,
Line 23, delete "acll", and insert -- all --.

Column 12,
Lines 3 and 4, delete '"Nretrieve"' and insert -- "retrieve" --.

Column 15,
Line 4, delete "Frame", and insert -- frame --.

UNITED STATES PATENT AND TRADEMARK OFFICE
CERTIFICATE OF CORRECTION

PATENT NO. : 6,330,576 B1
DATED : December 11, 2001
INVENTOR(S) : Takatoshi Mochizuki et al.

It is certified that error appears in the above-identified patent and that said Letters Patent is hereby corrected as shown below:

Column 17,
Line 12, delete "Which", and insert -- which --.
Line 20, delete "mn", and insert -- in --.
Line 35, delete "getting", and insert -- setting --.
Line 53, after "each", insert -- word/phrase related to this keyword is displayed at a display density which --.
Line 58, after "comprising", insert -- : --.
Line 64, after "performing", delete ",".

Column 18,
Line 22, after "displaying", delete ",".
Line 29, delete "In", and insert -- in --.
Line 32, delete "decree", and insert -- degree --.

Column 20,
Line 27, after "setting", delete ",".

Signed and Sealed this

Twenty-fourth Day of September, 2002

Attest:

JAMES E. ROGAN
*Attesting Officer*        *Director of the United States Patent and Trademark Office*